(12) United States Patent
Gryskiewicz et al.

(10) Patent No.: US 6,646,686 B1
(45) Date of Patent: Nov. 11, 2003

(54) MANAGING ALPHA VALUES FOR VIDEO MIXING OPERATIONS

(75) Inventors: Paul S. Gryskiewicz, Chandler, AZ (US); Aniruddha P. Joshi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 474 days.

(21) Appl. No.: 09/666,942

(22) Filed: Sep. 21, 2000

(51) Int. Cl.[7] .................................................. H04N 9/74
(52) U.S. Cl. ........................ 348/584; 348/589; 348/597
(58) Field of Search ................................ 348/584, 586, 348/587, 589, 590, 591, 592, 593, 598, 600, 474, 473, 476; 345/530, 545, 546, 547, 563, 629, 589, 582, 96, 43

(56) References Cited

U.S. PATENT DOCUMENTS

| | | | | |
|---|---|---|---|---|
| 5,912,710 A | * | 6/1999 | Fujimoto | 348/445 |
| 5,953,691 A | * | 9/1999 | Mills | 348/391 |
| 6,208,354 B1 | * | 3/2001 | Porter | 348/563 |
| 6,310,659 B1 | * | 10/2001 | Glen | 348/589 |

* cited by examiner

*Primary Examiner*—Michael H. Lee
*Assistant Examiner*—Trang U. Tran
(74) *Attorney, Agent, or Firm*—Trop, Pruner & Hu, P.C.

(57) ABSTRACT

Alpha values associated with video mixing operations are sent to a memory on a low pin count bus. The memory is accessible to a video mixer, which retrieves the alpha values to perform a mixing operation. The alpha values for a field are sent to the memory during the field time for a previous field rather than during the vertical blanking interval. The alpha values may be compressed prior to transmission.

22 Claims, 6 Drawing Sheets

MANAGING ALPHA VALUES FOR VIDEO MIXING OPERATIONS

BACKGROUND

This invention relates to alpha values and, more particularly, to transmission of alpha values for performing video mixing operations.

Applications for mixing digital video and personal computer (PC) graphics signals are increasingly popular. Digital video signals may be transmitted by cable, satellite, or other means, to a television display. PC graphics signals, typically generated by a software program running on a processor-based system, may be sent to a computer monitor.

A set-top box is a processor-based system that employs a television display instead of a computer monitor for viewing video signals, PC graphics signals, or a combination of the two. The set-top box may execute application software, such as electronic mail programs, connect to a data network such as the Internet using browser software, and receive and display television programming signals.

One component featured in some set-top boxes is a video mixer. The video mixer receives the digital video signal from an external source, such as via a coaxial cable connected to the set-top box, and mixes the signal with another video signal, such as a PC graphics signal, which may be generated from within the set-top box.

The video mixer may employ alpha values when combining video signals with PC graphics signals. An alpha value describes the opacity of a pixel, or picture element. The alpha value specifies how two pixels are to be combined in the video mixer. The resulting pixel may be solid, transparent, or some characteristic between the two. This combining operation is known as alpha blending.

During processing of the PC graphics and video signals, several thousand alpha values may be utilized. Because circuitry besides the video mixer may not use them, the alpha values may be routed to the video mixer only when needed. Their transmission to the mixer is thus synchronized with the video mixing operation, which typically occurs in real time.

Some prior art system transmit alpha values to the video mixer over a high-bandwidth bus such as a peripheral component interconnect (PCI) bus. For some set-top boxes, however, a lower cost alternative may be desirable.

Thus, there is a continuing need to provide a mechanism for efficiently handling alpha values during video mixing operations.

BRIEF DESCRIPTION OF THE INVENTION

DETAILED DESCRIPTION

According to the embodiments described herein, alpha values associated with video mixing operations are efficiently transmitted, for improved bandwidth. In one embodiment, the alpha values are transmitted to a memory buffer using a low-cost, low-power bus. The memory buffer is accessible to a video mixer such that the alpha values may be retrieved during video mixing operations. Additionally, in some embodiments, the alpha values may be encoded prior to transmission.

A video signal may be generated by a video camera, which "captures" a real-world scene. Digital video cameras, for example, may include a charge-coupled device (CCD) that captures an image as a matrix of pixels, or picture elements, each pixel having a distinct intensity component.

For each pixel, the intensity component may be described as one or multiple components. For example, if the camera is a color camera, the camera may record a red, a green, and a blue component for each intensity value. Alternatively, the intensity component may be defined in terms of its luminance and chrominance. In some systems, a byte of information is used for each component. Thus, each pixel may be defined using multiple bytes of information. Along with synchronization and other information, these bytes make up the video signal or video stream.

PC graphics signals, by contrast, are typically generated using computationally intensive software programs on a processor-based system. The PC graphics signal is usually displayed on a computer monitor rather than a television display. Like the video signal, however, the PC graphics signal typically is made up of multiple bytes of data representing the intensity of each pixel of the resulting graphics image.

In addition to intensity information, each pixel of the PC graphics signal may include alpha values. Alpha values are used to combine the PC graphics signal with one or more video signals. Typically, the alpha values are only used during video mixing operations.

Alternatively, alpha values may be associated with a display monitor, such as a television display, instead of with the PC graphics signal. For example, alpha values may be used to restrict the placement of PC graphics signals to only a particular area of the display.

Figure 1:
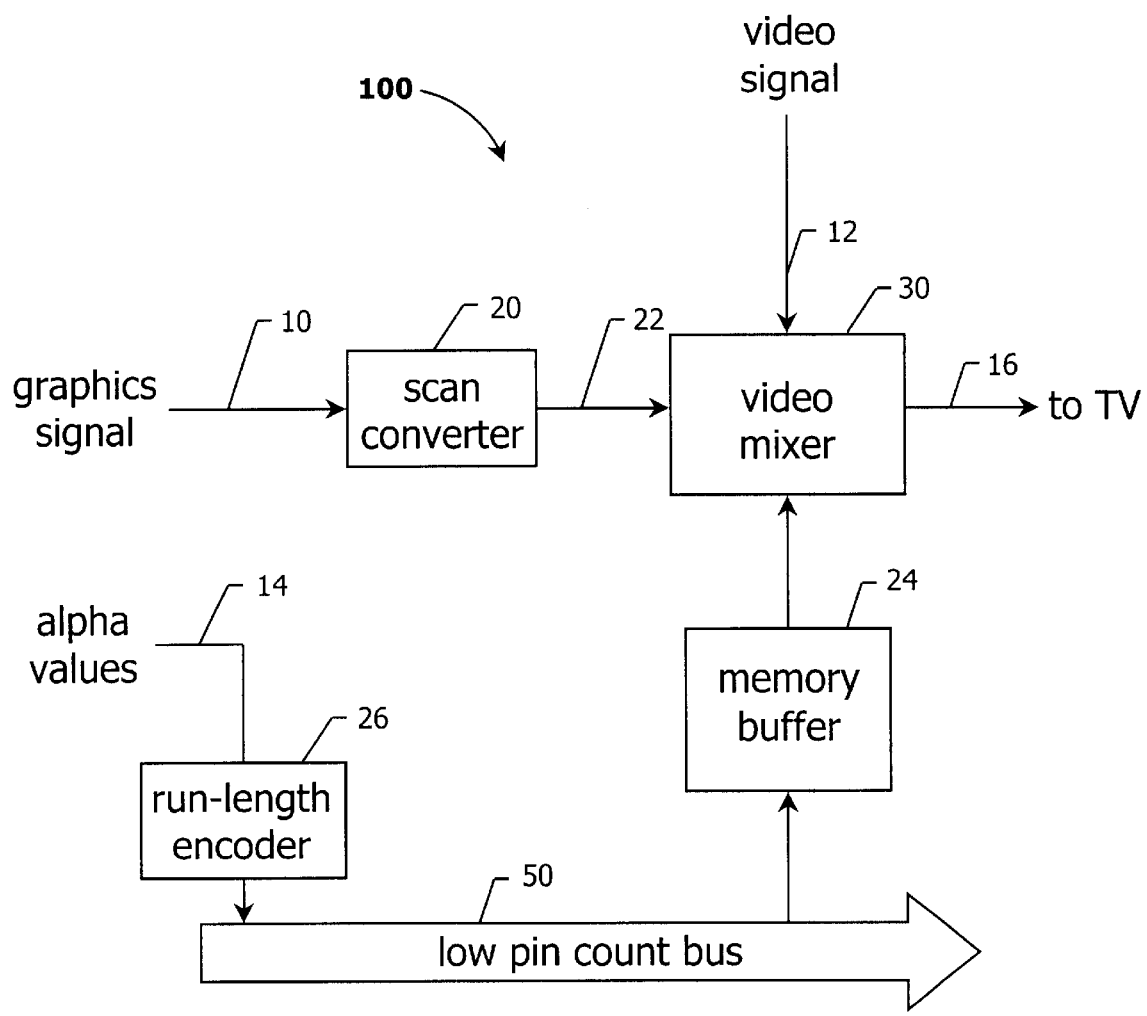
FIG. 1 is a block diagram of a system using a low pin count bus according to one embodiment of the invention.

In FIG. 1, a system 100 receives a graphics signal 10 and a video signal 12, according to one embodiment. The graphics signal 10 is to be combined with the video signal 12 in a video mixer 30, resulting in a mixed video data stream 16, suitable for display. In one embodiment, the system 100 is a processor-based system such as a set-top box and the graphics signal 10 and the video signal 12 are digital signals.

The graphics signal 10 includes intensity information for each pixel of the image to be displayed. The intensity information may include color information, such as red, green, and blue values. Alternatively, the intensity information may include chrominance and luminance information.

The system 100 further receives alpha values 14. In one embodiment, the alpha values specify how the graphics signal 10 and the video signal 12 are to be combined, such that the resulting image looks as intended.

The alpha values 14 may be associated with the pixels of the graphics signal 10, the video signal 12, or the television display (not shown). A distinct alpha value 14 may thus be associated with each pixel to be displayed. Alternatively, a group of pixels may share an alpha value 14, in some embodiments. Nevertheless, for a typical transmission of data to a display, the alpha values 14 may comprise several thousand bytes of data.

Typically, one or more video signals is streamed into a set-top box from an external source, such as via a cable connection. PC graphics signals, by contrast, are usually generated internally. Where the video and PC graphics signals are to be combined, therefore, the PC graphics signal is synchronized with the timing of the incoming video signal, the two signals are mixed, and the mixed signal is sent to the display. Preferably, such operations are performed in real time.

The alpha values are also typically synchronized with the incoming video signal. Each field of video data is preceded by a vertical blanking interval (VBI). In some prior art systems, the alpha values associated with the field being mixed are transmitted to the video mixer during the VBI. The alpha values are thus streamed just in advance of being used by the video mixer.

In such prior art systems, a high-bandwidth bus may be used to transmit the alpha values to the video mixer. For example, the systems may include a peripheral component interconnect (PCI) bus to transmit the alpha data to the video mixer during the VBI. The PCI Specification is available from The PCI Special Interest Group, Portland, Oreg. 97214.

The PCI bus is a high-performance bus. A PCI device uses 62 pins (50 pins, plus various power and ground pins) and employs a significant gate count. The PCI bus may thus not be desirable for some low-cost systems.

Thus, according to one embodiment, the system 100 employs a low pin count (LPC) bus 50 for transmitting the alpha 14 to the video mixer 30 (FIG. 1). Additionally, a memory buffer 24, accessible to the video mixer 30, acts as a temporary storage for the alpha values 14, in some embodiments.

Like most buses, the LPC bus 50 transmits address, data, and control signals between circuitry of the system 100. As the name suggests, the low pin count (LPC) bus 50 uses fewer pins than traditional buses found in many processor-based systems, such as the industry standard architecture (ISA) bus, the X-bus, and the peripheral component interconnect (PCI) bus. The LPC bus 50 uses seven pins, with the capability to add six more, for additional features. In some embodiments, the smaller pin count of the LPC bus 50 translates to cost savings for the board designer.

Because the LPC bus 50 is a lower bandwidth bus than the PCI bus, less throughput of data transmitted over the LPC bus 50 is expected. Thus, according to one embodiment, the system 100 transmits the alpha values 14 to the video mixer 30, not during the VBI of the video signal 12, but during the "field time" of the video signal, which is a longer period of time. As long as the alpha values 14 for a particular field are transmitted in advance of the video mixing of that field, the video mixing operation may be performed substantially in real time, even with the slower bandwidth bus.

Before the graphics signal 10 is mixed with the video signal 12, the characteristics of one signal may be converted to be compatible with the other signal. These characteristics may include both the resolution of the image and its refresh rate, e.g., the number of times the image is sent to the display.

Figure 2:
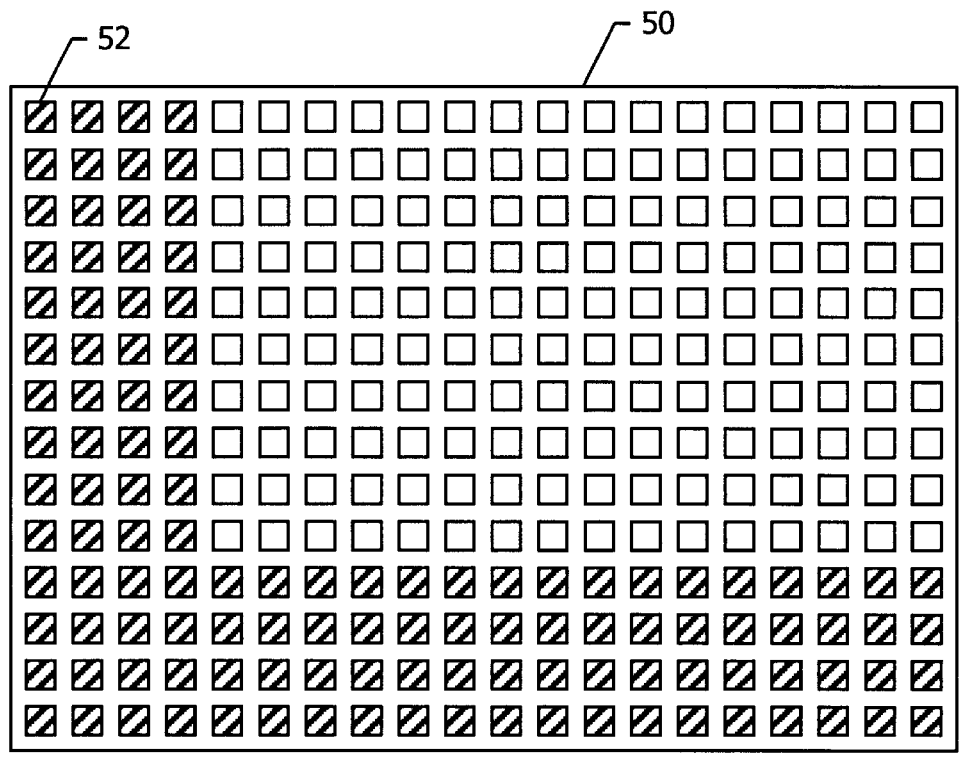
FIG. 2 is a diagram of an image display and associated alpha values according to one embodiment of the invention.

The resolution of a hypothetical signal is the number of pixels that comprise a unit, known as a frame, of an image displayed using the signal. In FIG. 2, a frame 50 is comprised of a plurality of pixels 52. The hypothetical frame 50 has a resolution of 20×14, with twenty pixels 52 running horizontally across and fourteen pixels 52 running vertically down the frame 50. Typically, video or graphics signals have resolutions such as 640×480, 800×600 or 1024×768.

The refresh rate, also known as the vertical refresh rate, is the speed at which the hypothetical signal is retransmitted to a display screen. For example, a vertical refresh rate of 60 Hz indicates that the entire screen is drawn, from left to right, top to bottom, sixty times per second. Refresh rates of 70 Hz, 72 Hz and 85 Hz are also popular.

Although set-top boxes are processor-based systems, a television display, not a computer monitor, is used to view PC graphics and analog or digital video signals. As explained above, PC graphics signals are created for display on a PC monitor, not a television display. Thus, where a television display is used to view a PC graphics signal or a combined video and PC graphics signal, the PC graphics signal first undergoes conversion.

Accordingly, in one embodiment, a scan converter 20 (FIG. 1) receives the graphics signal 10 and renders it suitable for subsequent mixing with the video signal 12. Adjustments to both the resolution and the refresh rate of the graphics signal 10 are typically performed by the scan converter 20. In one embodiment, the video signal 12 requires no scan conversion. Accordingly, the scan conversion is performed only on the graphics signal 10, prior to the video mixing operation, in one embodiment.

Additionally, PC graphics signals are typically progressive, while video signals are typically interlaced. Where the hypothetical frame 50 of FIG. 2, for example, is part of a progressive signal, the first row of pixels 52 is transmitted, followed by the second row of pixels 52, and so on, until the entire frame 50 is sent to the display.

Figure 3:
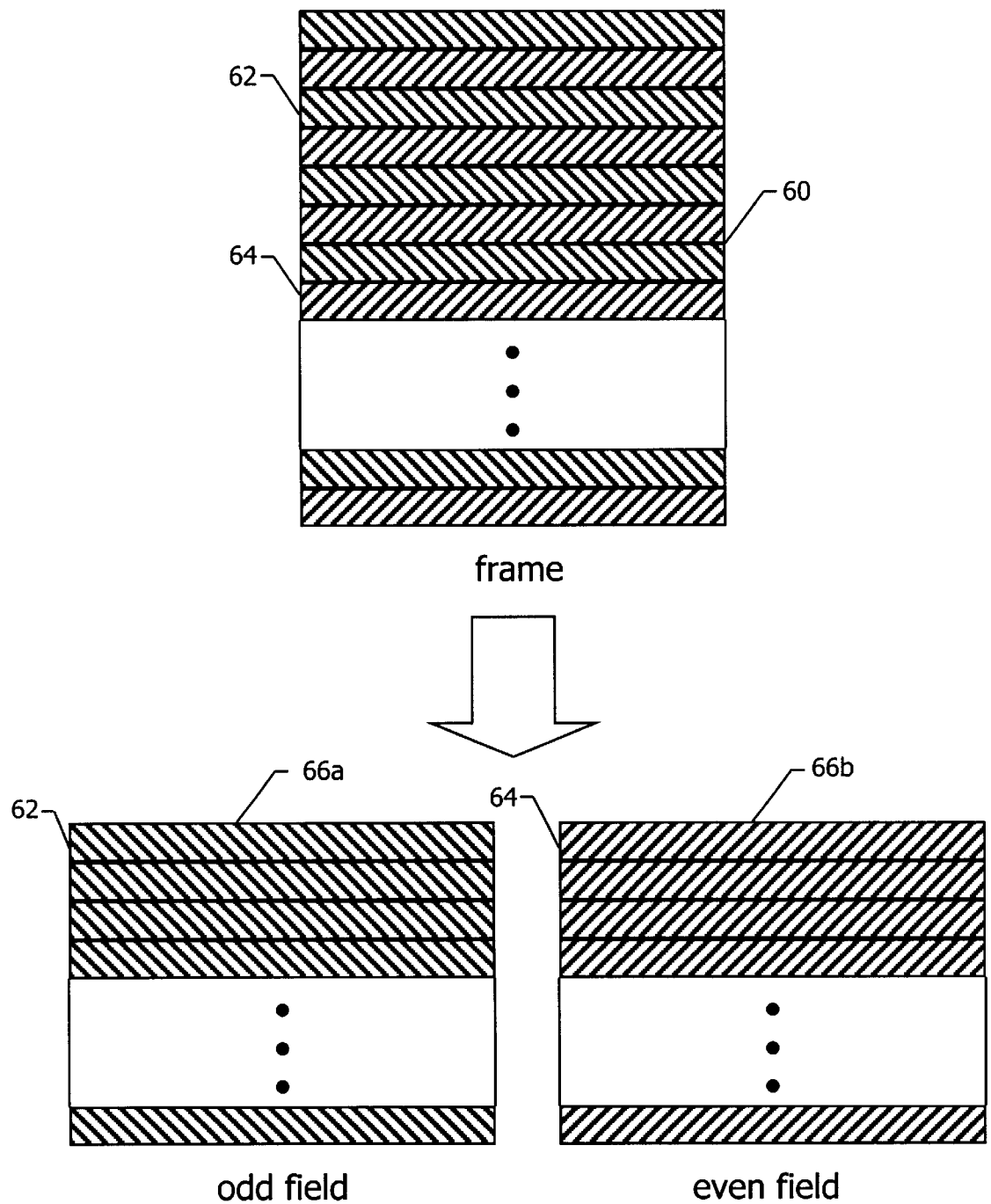
FIG. 3 is a block diagram of an interlaced frame and associated fields according to one embodiment of the invention.

Interlaced signals are transmitted differently than progressive signals. In FIG. 3, according to one embodiment, a frame 60 is comprised of a plurality of odd rows 62 and a plurality of even rows 64. A field 66a, or odd field, is a combination of the odd rows 62 of the frame 60; a field 66b, or even field, is a combination of the even rows 64 of the frame 60. Interlaced signals are transmitted one field 66 at a time. Thus, all the odd rows 62 are transmitted, then all the even rows 64 are transmitted, to a display. The refresh rate determines how many times each second the fields 66 are sent to the display.

Thus, according to one embodiment, the scan converter 20 additionally performs operations to convert the graphics signal 10 into the interlaced graphics signal 22. The interlaced graphics signal 22 may then be combined with the video signal 12 in the video mixer 30.

The alpha value is typically a numerical value between zero and one. In one embodiment, each alpha value 14 works as a transparency mask, indicating how the color values for each graphics pixel should be merged with the color values of each video pixel, for example.

In FIG. 2, an alpha mask 54 is associated with the frame 50, according to one embodiment. The alpha mask 54 consists of only zeroes and ones, where a '0' pixel indicates that an associated graphics pixel is transparent, or "off," and a '1' pixel indicates that the associated graphics pixel is opaque, or "on," when mixed with one or more video signals. This scheme is illustrative only, as actual alpha values may indicate a broader range of actions than merely "on" and "off."

In FIG. 2, some of the pixels 52 of the frame 50 are shaded. The shaded pixels 52 are associated with the '1' values of the alpha mask 54. Accordingly, the alpha mask 54 allows graphics data to occupy only the region of the frame 50 where the shaded pixels 52 are indicated. Such an alpha mask 54 may, for example, be used where graphics is to be displayed at the bottom and left side of the frame 50, and where video data may occupy the rest of the frame 50.

During the video mixing operation, the alpha values 14 indicate how the video signal 12 and the graphics signal 10 are to be combined. The video mixer 30 receives a stream of video data 12 and a stream of converted graphics data 22. Before combining the signals 12 and 22, the video mixer 30 retrieves the alpha values 14 from the memory buffer 24. The signals 12 and 22 are combined, using the alpha values 14.

As a temporary storage for the alpha values 14, the memory buffer 24, in some embodiments, obviates the monopolization of the LPC bus 50 during transmission of the alpha values 14. Instead of bursty transmissions, wherein alpha values 14 are sent for each line of video being mixed, the memory buffer 24 permits fewer transmissions to utilize the LPC bus 50, comprising more alpha values 14, than would be transmitted when no memory buffer 24 is present. The LPC bus 50 is thus free to be utilized by other devices, as needed.

As explained above, the system 100 sends the alpha values 14 associated with a field of data to the memory buffer 24 using the LPC bus 50. Because the LPC bus 50 has a lower bandwidth than the PCI bus, according to one embodiment, the "field time" for a prior field of data is the time during which the alpha values 14 are transmitted to the memory buffer 24, not the VBI period for the current field.

As an example, consider an analog color video signal typically used to transmit television programming. One known standard is the National Television Standards Committee (NTSC), in which a 525-line color video signal has a 59.95 Hz field rate (NTSC, 1953). A horizontal blanking interval indicates the start of a line of active video. The horizontal blanking interval is approximately 10.5 usec. The active video period is 53 usec. Thus, the "horizontal line time," or the time it takes to transmit a line of color video, is approximately 63.5 usec.

The vertical blanking interval for the same signal takes 1333.5 usec, which is equivalent to 21 horizontal line times. The VBI is used to indicate the start of a field of data. Since a field of a color video signal (in the United States) includes 262½ lines, the "field time" of a color video signal is:

63.5 usec×262½=16668.75 usec which is equivalent to 12½ times the VBI period. Another way to calculate the field time is to invert the field rate:

1/59.95 Hz=16680.5 usec

By using the field time, the system 100 has 12½ times as long to transmit the alpha values 14 to the memory buffer 24 than if the VBI were used. By transmitting the alpha values 14 associated with a field during the field time of a prior field, the system 100 may use the lower bandwidth LPC bus 50 and yet perform the video mixing operation in real time.

Thus, according to one embodiment, the alpha values 14 are transmitted by the LPC bus 50 to the memory buffer 24 during the field time of the video signal 12. The LPC Interface Specification, Revision 1.0, Sep. 29, 1997, is published by Intel Corporation. In some embodiments, the effective bandwidth of the system 100 is increased.

For example, while two odd fields 66a, one for the converted graphics 22 and one for the video 12, are being mixed in the video mixer 30, the alpha values 14 for a subsequent even field 66b may be sent over the LPC bus 50 to the memory buffer 24, according to one embodiment. Thus, during each field time, the alpha data 14 associated with a subsequent field 66 is transferred to the memory buffer 24, for retrieval by the video mixer 30 in the next field time.

Figure 4:
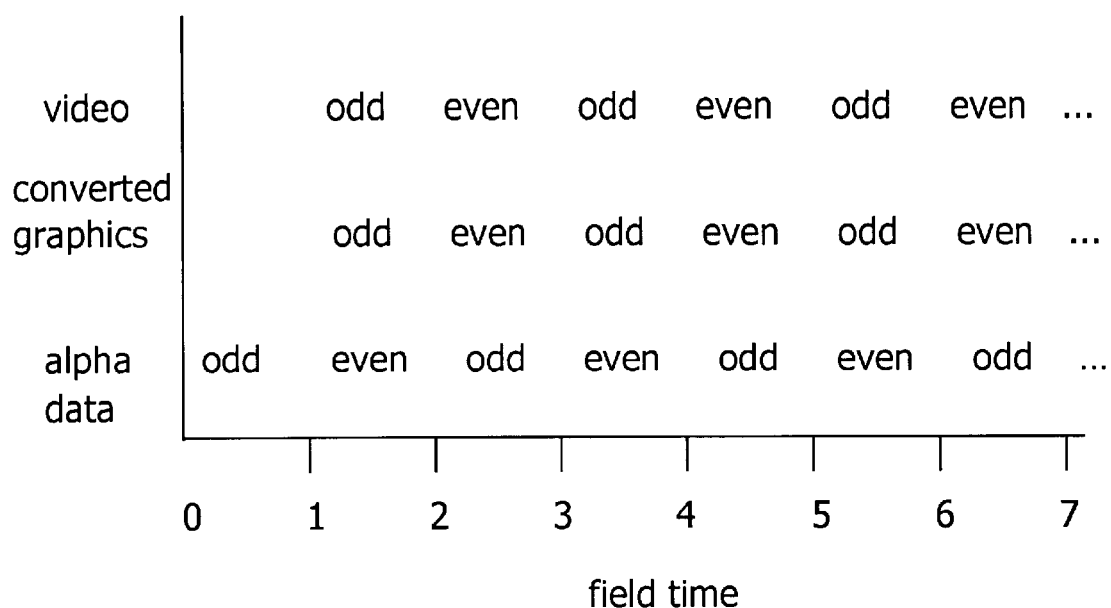
FIG. 4 is a time line for processing the video, graphics, and alpha data according to one embodiment of the invention.

The operation, according to one embodiment, is depicted in FIG. 4. In the first field time, alpha data 14 associated with an odd field 66a is sent to the memory buffer 24. No action with the video data 12 or the converted graphics data 22 occurs. Then, in the second field time, a converted graphics odd field 66a and a video odd field 66a are streamed to the video mixer 30. The video mixer 30 also retrieves the alpha data 14, already stored in the memory buffer 24, associated with the odd field 66a. Also during the second field time, alpha data 14 associated with an even field 66b is sent to the memory buffer 24. The process continues in this manner, with the alpha data 14 always a field "ahead" of the field 66 being sent to the video mixer 30.

Figure 5:
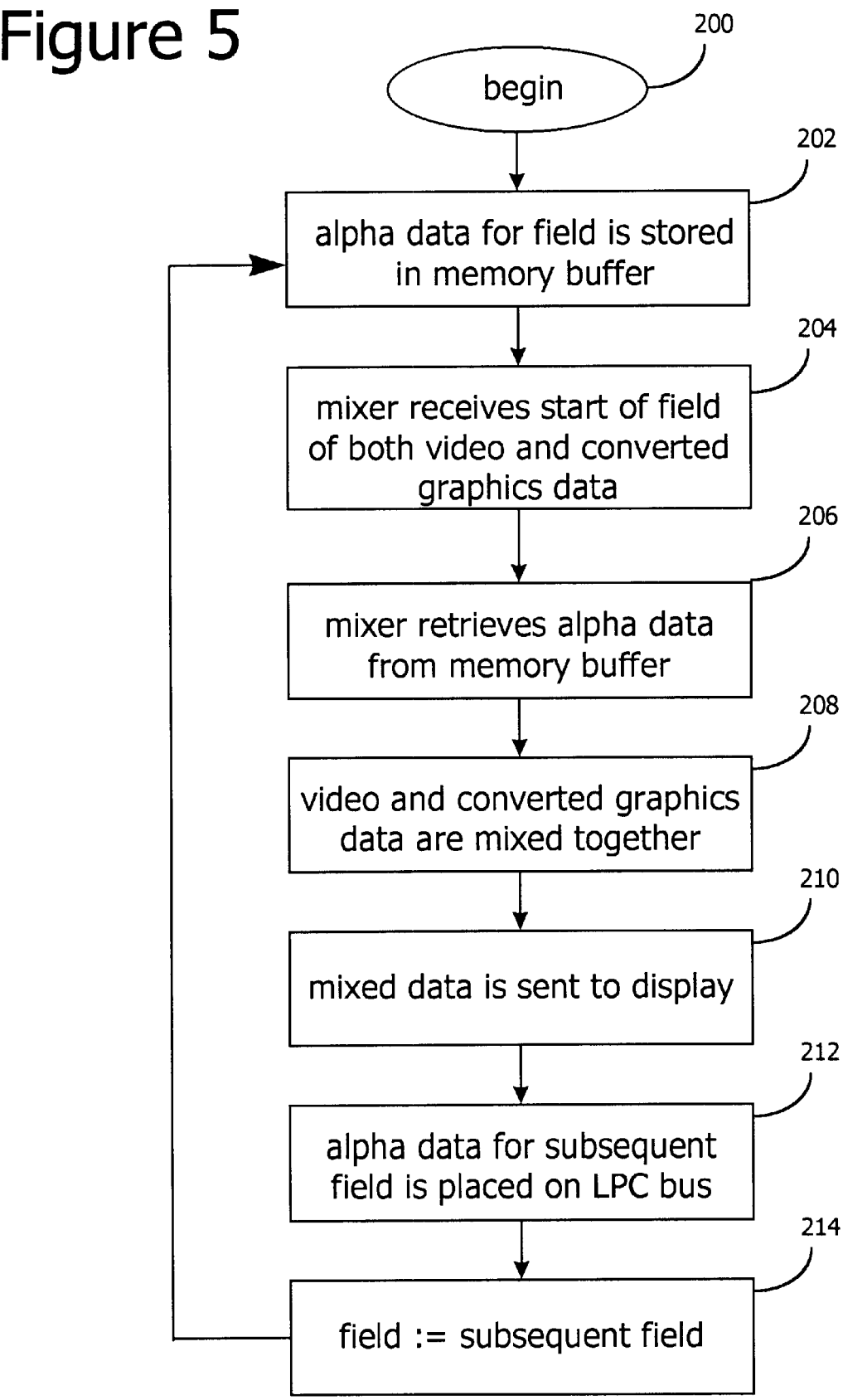
FIG. 5 is a flow diagram illustrating operation of the system according to one embodiment.

In FIG. 5, a flow diagram illustrates operation of the system 100, according to one embodiment. The video mixer 30 receives both the video signal 12 and the converted graphics signal 22 as interlaced signals. Accordingly, the video mixer 30 receives an odd field 66a, followed by an even field 66b, followed by an odd field 66a, as a stream of pixels, from each of the video signal 12 and the converted graphics signal 22.

Before the video mixer 30 receives any data, however, in one embodiment, alpha data 14 for a field 66 is stored in the memory buffer 24 (block 202), such as in a first field time. The remaining operations depicted in FIG. 5 occur in a subsequent field time, such as when the video mixer 30 begins receiving a field 66 of incoming video data 12.

The video mixer 30 receives the start of a field 66 of both the converted graphics 22 and the video data 12 (block 204). The video mixer 30 retrieves the already stored alpha data 14, associated with the same field 66, from the memory buffer 24 (block 206). Guided by the alpha data 14, the converted graphics data 22 and the video data 12 is combined in the video mixer 30 (block 208).

The mixed data 16 is then sent to a display (block 210). While the field 66 is displayed, the alpha data 14 for a subsequent field 66 is placed upon the LPC bus 50 (block 212). The process is repeated (block 214), until all fields 66 have been processed.

Instead of using the VBI to transfer the alpha values 14 to the video mixer 30, the VBI may be used to identify a new field time. In one embodiment, the VBI is used to trigger the transmission of new alpha values 14 over the LPC bus 50. As long as a field of alpha values 14 are transmitted before the next occurrence of the VBI, the system 100 may successfully perform video mixing operations in real time.

The number of alpha values 14 transmitted within the system 100 may be substantial. Typically, however, a single alpha value 14 may be used for multiple pixels. For an 800×600 resolution graphics signal which transmits thirty frames per second, 480 Kbytes of graphics data are received by the system 100 every $\frac{1}{30}^{th}$ of a second, for 14.4 Mbytes each second. Even where the number of pixels per alpha value is high, several thousand alpha values may nevertheless be transmitted every second, for real-time processing. An efficient routing of the alpha values 14 may thus substantially improve throughput for some systems.

The system 100 may further improve throughput by encoding the alpha values 14 prior to transmission over the LPC bus 50. For example, in one embodiment, the system 100 receives the alpha values 14 into a run-length encoder 26 (FIG. 1). Run-length encoding is a technique for compressing data, such as to increase the effective bandwidth of the data during transmission. In one embodiment, the run-length encoder 26 is a software program executed on a processor-based system, which compresses the stream of alpha values 14 entering the system 100.

Run-length encoding detects "runs" of identical values, such as multiple ones, and replaces them with a shorthand code. In one embodiment, the run-length encoder 26 employs 10 Kbytes per field, 5 Kbytes for alpha values 14 and 5 Kbytes for the run-length encoding shorthand code. The run-length encoder 26 thus receives 10 Kbytes, 60 times/second, or 600 Kbytes/second.

In one embodiment, the LPC bus 50 accepts data at a rate of two Mbytes/second. The data rate of the run-length encoder 26 is therefore compatible with the data throughput of the LPC bus 50.

Figure 6:
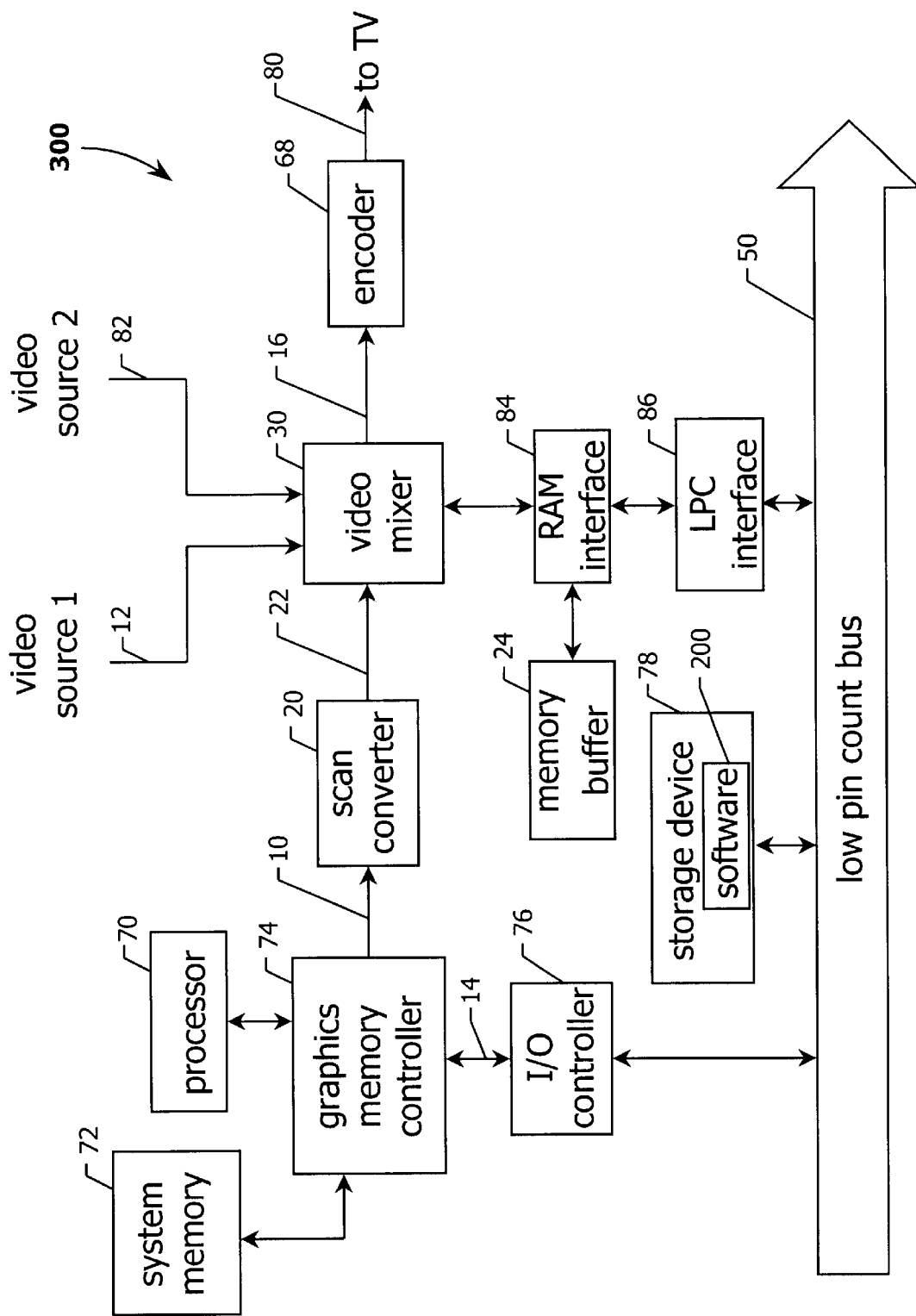
FIG. 6 is a block diagram of the system in a set-top box according to one embodiment of the invention.

In FIG. 6, the system 100 is part of a set-top box 300, according to one embodiment. A processor 70 and a system memory 72 are coupled to a graphics memory controller 74. The graphics memory controller 74 combines graphics and memory control, such as is provided by the Intel 82810 memory graphics controller, available from Intel Corporation, Santa Clara, Calif. Alternatively, graphics control and memory control may be separate elements.

The system memory 72 may be a random access memory (RAM) such as dynamic random access memory (DRAM), synchronous DRAM (SDRAM), static RAM (SRAM) or Rambus® DRAM (RDRAM). The system memory 72 may receive executable software, for producing the graphics signal 10, the alpha values 14, or for performing other operations.

The graphics signal 10 is received from the graphics memory controller 74, such as by executing a software program 200. In one embodiment, the software program 200 is loaded from a storage device 78 into the system memory 72. The software program 200, upon execution, produces the graphics signal 10.

In one embodiment, the software program 200 also produces the alpha values 14. In a second embodiment, the alpha values 14 are based on information received from the television display (not shown). For example, the television display may include a user interface, in which users may select the characteristics of certain display features, e.g., how graphics is presented on the display, and so on. This information may be used to generate the alpha values 14, such as by the software program 200, or by discrete logic within the set-top box 300.

In one embodiment, the software program 200 further perform a run-length encoding operation, to produce the alpha values 14. The alpha values 14 are received by the LPC bus 50, according to one embodiment, through an I/O controller 76. In one embodiment, the Intel 810 chipset, including both the 82810 memory graphics controller and the I/O controller, are part of the set-top box 300.

The alpha values 14 may be received by the memory buffer 24 through an LPC interface 86 and a RAM interface 84, as illustrated in FIG. 6. In one embodiment, the memory buffer 24 and the RAM interface 84 are embedded in other circuitry of the system 100 as on-chip memory. On-chip memory may be preferred over a dedicated memory for designs where board space and cost are considerations. The video mixer 30 receives the alpha values 14 from the RAM interface 84.

The set-top box 300 further includes an encoder 68, which receives the mixed digital video data 16, before being sent to a television display (not shown). In one embodiment, the television display receives video in analog form. Accordingly, the encoder 60 converts the mixed digital video data 16 to analog video suitable for the television circuitry.

Thus, according to the embodiments described herein, alpha values may efficiently be transmitted prior to mixing operations. The alpha values are routed to a memory buffer, accessible to a video mixer, using a LPC bus, in one embodiment. The field time of a video signal, rather than the vertical blanking interval, is the time period used to transmit the alpha values, in one embodiment. The alpha values may additionally be encoded prior to transmission, in one embodiment.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving alpha values associated with a video field into a memory buffer in a first field time;
   receiving a graphics signal and a video signal associated with the field into a video mixer in a second field time;
   receiving the alpha values from the memory buffer into the video mixer; and
   combining the graphics signal with the video signal using the alpha values.

2. The method of claim 1, wherein receiving alpha values associated with a video field into a memory buffer in a first field time comprises:
   identifying a start of the second field time; and
   transmitting the alpha values to the video mixer.

3. The method of claim 2, wherein identifying a start of the second field time comprises receiving a vertical blanking interval signal from the video signal.

4. The method of claim 1, wherein receiving alpha values associated with a video field into a memory buffer in a first field time further comprises:
   run-length-encoding the alpha values; and
   transmitting the alpha values to the memory buffer using a low pin count bus.

5. The method of claim 1, further comprising:
   sending the graphics signal to a scan converter; and
   converting the graphics signal.

6. The method of claim 5, wherein converting the graphics signal further comprises:
   identifying a resolution of the video signal; and
   adjusting the graphics signal to fit the resolution.

7. The method of claim 5, wherein converting the graphics signal further comprises:
   identifying a refresh rate of the video signal; and
   adjusting the graphics signal to fit the refresh rate.

8. The method of claim 5, wherein converting the graphics signal further comprises transforming the graphics signal into an interlaced signal.

9. A method comprising:
   encoding alpha values associated with a field in a first field time;
   receiving a graphics signal and a video signal associated with the field into a video mixer in a second field time;
   sending the alpha values to the video mixer over a low pin count bus; and
   combining the graphics signal with the video signal using the alpha values.

10. The method of claim 9, wherein encoding alpha values associated with a field in a first field time further comprises:
   identifying a start of the second field time; and
   encoding the alpha values.

11. The method of claim 10, wherein identifying a start of the second field time further comprises receiving a vertical blanking interval signal from the video signal.

12. The method of claim 9, wherein encoding alpha values associated with a field in a first field time further comprises:
   run-length-encoding the alpha values; and
   transmitting the alpha values to a memory buffer using the low pin count bus.

13. A system comprising:
   a memory to store alpha values in a first field time; and
   a video mixer coupled to the memory to:
      retrieve the alpha values from the memory; and
      combine a video signal with a graphics signal in a second field time, using the alpha values.

14. The system of claim 13, further comprising:
   a scan converter to:
      receive the graphics signal;
      identify a property of the video signal; and
      convert the graphics signal according to the property.

15. The system of claim 13, wherein the first field time is a field time that precedes the second field time.

16. The system of claim 14, further comprising a low pin count bus to transmit the alpha values to the memory, wherein the low pin count bus comprises seven required pins and six optional pins.

17. The system of claim 16, further comprising an encoder to encode the alpha values before transmission using the low pin count bus.

18. The system of claim 17, wherein the encoder is a run-length encoder.

19. The system of claim 16, further comprising:
   a processor; and
   a software program comprising instructions that, if executed by the processor, enable the system to perform run-length encoding on the alpha values.

20. The system of claim 14, further comprising:
   an encoder coupled to the video mixer to convert the mixed video signal to an analog signal.

21. An article comprising a medium comprising instructions which, if executed, enable a processor-based system to:
   receive alpha values associated with a field into a memory buffer in a first field time;
   receive a graphics signal and a video signal associated with the field into a video mixer in a second field time;
   retrieve the alpha values from the memory buffer into the video mixer; and
   combine the graphics signal with the video signal using the alpha values.

22. The article of claim 21, further storing instructions which, if executed, enable a processor-based system to:
   run-length-encode the alpha values; and
   transmit the alpha values to the memory buffer using a low pin count bus.

* * * * *